United States Patent [19]

Hellman et al.

[11] 3,995,892
[45] Dec. 7, 1976

[54] SEAT COVER FASTENING SYSTEM

[75] Inventors: Richard F. Hellman, Milwaukee; Garth O. Hall, New Berlin, both of Wis.

[73] Assignee: UOP Inc., Des Plaines, Ill.

[22] Filed: Dec. 29, 1975

[21] Appl. No.: 645,121

[52] U.S. Cl. .............................. 297/219; 297/218; 5/353.1
[51] Int. Cl.² ........................................ A47C 27/00
[58] Field of Search ............... 5/339, 353.1, 353.2, 5/353.5, 353.6; 160/391, 392, 394, 395, 397; 297/218, 219, 226

[56] References Cited
UNITED STATES PATENTS

| | | | |
|---|---|---|---|
| 1,301,021 | 4/1919 | Walker | 5/353.1 X |
| 3,794,378 | 2/1974 | Haslem et al. | 297/219 |

*Primary Examiner*—James C. Mitchell
*Attorney, Agent, or Firm*—James R. Hoatson, Jr.; Barry L. Clark; William H. Page, II

[57] ABSTRACT

Fastening system for seat covers permits rapid assembly of a seat cover to a seat back member while preventing unauthorized removal of the seat cover. The system includes a split tube which may be loosely positioned in a recess in the seat member. A stiff, elongated retaining member of a material such as fiberboard or plastic is attached along the length of each of the ends of the upholstery material and both ends are then inserted into the slot in the tube. The normal tension forces on the upholstery force at least portions of the retaining members to move away from the slot and act as barbs to resist removal of the upholstery from the slot.

8 Claims, 6 Drawing Figures

U.S. Patent     Dec. 7, 1976     3,995,892
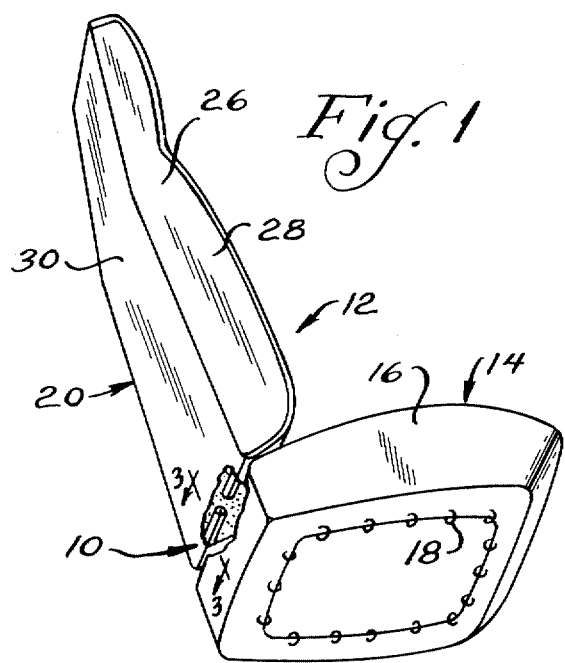
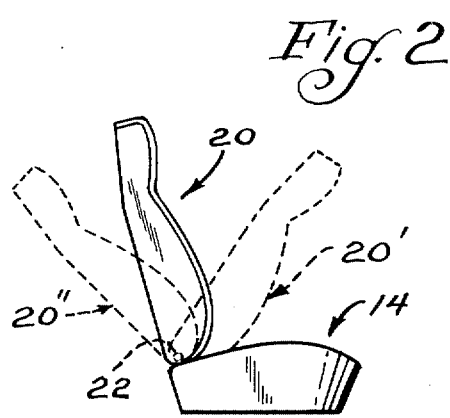
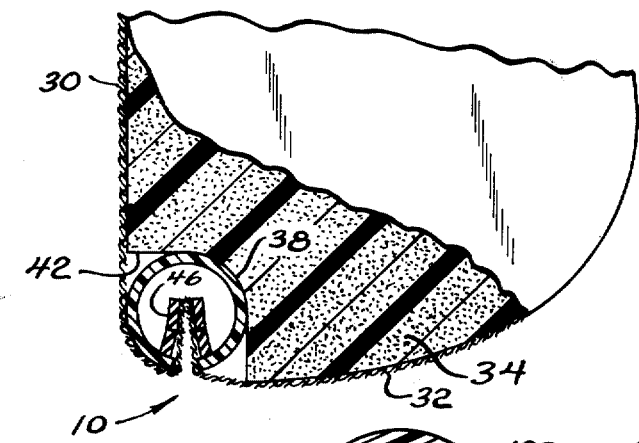
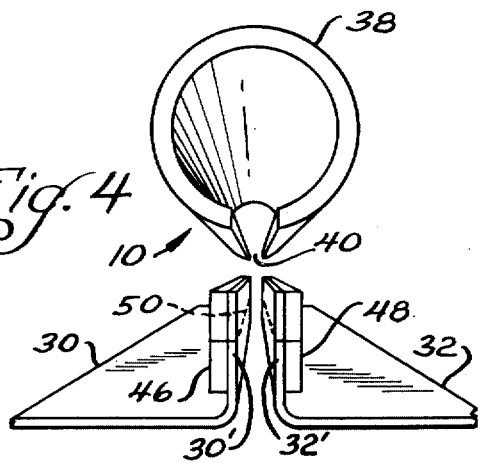
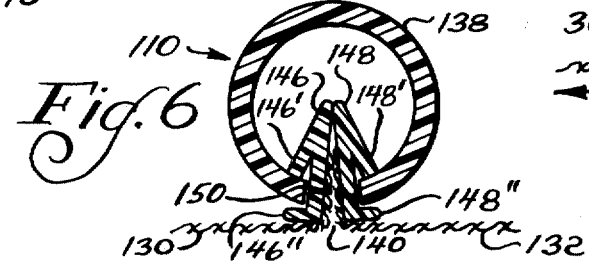
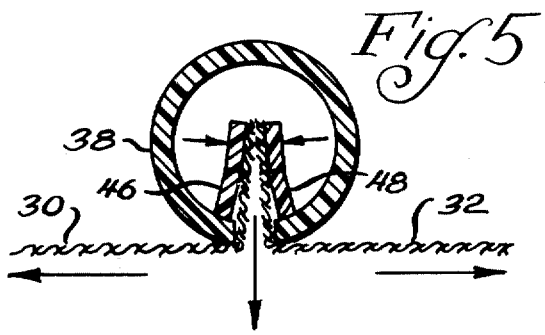

3,995,892

SEAT COVER FASTENING SYSTEM

BACKGROUND OF THE INVENTION

The invention relates to seating and particularly to a fastening system for attaching a seat cover to a seat back member. Conventionally, seat covers for seat backs, such as those used in automotive vehicles, are slipped like a pillowcase over the seat back member and attached to the seat member along their free end edges by staples or hog rings. Such fastening methods consume considerable time and, because the tension loads are applied at spaced points, cause much greater strain on the upholstery material than would be the case if the material was tensioned uniformly along its length. Furthermore, especially where hog rings are used, such fasteners present the possibility that the fingers of a seat occupant could be cut. Also, in seats such as those with reclining and/or forward folding backs, where the joining line of the upholstery end portions can be viewed, the presence of hog rings or staples is quite displeasing from an esthetic point of view. U.S. Pat. No. 3,804,457 shows structure which accommodates the movement of a seat back but requires the use of considerable amounts of material and labor.

SUMMARY

It is among the objects of the present invention to provie a seat cover fastening system which overcomes the aforementioned disadvantages of prior art fastening systems while providing a low cost, esthetically pleasing fastening system which permits very rapid assembly of a seat cover to a seat back member.

These and other advantages are achieved by the seat cover fastening system of the present invention which incorporates a longitudinally slotted metal or plastic tube recessed in the surface of the seat member and a pair of longitudinally extending relatively rigid retaining members which are sewn to the ends of the seat cover. The composite seat cover ends and retaining members are adapted to be inserted through the slot in the tube so that at least portions of the retaining members are retained by the walls of the tube adjacent the slot. The seat cover is preferably sized relative to a compressible seat member which it surrounds so that the seat cover material will be tensioned when the ends and strips are within the tube. The tension, coupled with the fact that the portions of the upholstery material outside the slot are directed generally tangentially to the slot serves to apply a force to the retaining members which will prevent their unauthorized removal from the slots.

BRIEF DESCRIPTION OF THE DRAWINGS

FIG. 1 is a perspective view of a seat whose seat back seat cover is retained by the improved fastening system;

FIG. 2 is a side view of the seat of FIG. 1 showing several positions which the seat back can take;

FIG. 3 is a fragmentary cross-section taken on line 3—3 of FIG. 1;

FIG. 4 is a perspective end view showing the portions of one embodiment of the fastening system prior to assembly;

FIG. 5 is an end sectional view showing the portions of the fastening system of FIG. 4 after assembly; and FIG. 6 is an end sectional view similar to FIG. 5 but showng a modifid form of retaining member.

DESCRIPTION OF THE PREFERRED EMBODIMENTS

Referring to FIG. 1, the relationship between the improved fastening system 10 and a seat assembly 12 is illustrated. The seat assembly 12 comprises a seat bottom cushion 14 covered by upholstery 16 which is attached to the seat frame (not shown) by hog rings 18. The seat back 20 is preferably pivoted about pivot axis 2 (FIG. 2) for movement between a forward tilting position 20' and a rearward reclining position 20" shown in dotted lines. The seat back 20 is covered with a cover 26 comprising side upholstery panels 28, a rear panel 30 and a front panel 32 (FIG. 3). The cover 26 is preferably sized relative to the underlying resilient foam 34 in the seat back 20 so that the foam will be slightly compressed as the cover is pulled down over it during assembly.

The cover 26 is maintained under tension by the fastening system 10 as illustrated in FIG. 3. The fastening system 10 comprises a rigid tube 38 of a rigid material such as metal or plastic having a longitudinal slot 40. The tube 38 is preferably freely positioned in a recess 42 formed in the foam 34 but could also be molded into the foam or fastened to the seat back frame (not shown) if desired. The lower ends 30', 32' of the rear and front panels 30, 32 have relatively rigid retaining members such as strips 46, 48 of a material such as plastic or fiberboard affixed to them such as by a line of sewing thread 50. Prior to assembly, the panel end portions 30', 32' are brought toward each other as shown in FIG. 4 so as to tension the panels 30, 32 and compress the foam 34. The end portions 30', 32' with the attached strips 46, 48 are then moved upwardly through the slot 40 until the strips are above the slot. Preferably, the slot 40 is just slightly wider than the combined thickness of both end portions 30', 32' and one of the strips 46 or 48. In this situation, it is necessary to insert one of the end portion and strip composites through the slot 40 to provide sufficient clearance for the second composite. Once the composites are inserted through the slot 40 into the inside of tube 38, downward forces applied to the end portions 30', 32' by the tension in panels 30, 32, as indicated by the arrows, will cause the rigid strips 46, 48 to cant slightly as shown in FIG. 5 to engage the inner tube walls adjacent the slot 40. The engagement of the relatively rigid strips 46, 48 with the tube walls will cause the inner end portions 30', 32' to be retained against unauthorized removal within the tube 38. If authorized removal is desired, the tube 38 can be mounted in the seat back so that it can be moved axially. The slot 40 can also be made as wide or slightly wider than the thickness of both composites, but the resulting further separation of the end portions 30', 32' would not be as esthetically pleasing as the closer separation provided by a narrow slot and might be more tempting to a vandal.

FIG. 6 shows a modification in which the fastening system 110 includes formed retaining members 146, 148 which are sewn at 150 to upholstery panels 130, 132. The retaining members, which may be formed of extruded plastic, have barb portions 146', 148' which can be resiliently deformed as the members are inserted into slot 140 in tube 138. The barbs can then spring out and engage the inner walls of the tube and prevent withdrawal. Angled lips 146" and 148" serve to protect the upholstery material where the edges of the tube 138 which form the slot 140 are rough, such as could be the case if the tube 138 were made of metal.

We claim as our invention:

1. In a seat member having a compressible cushion portion and an upholstery portion surrounding said compressible cushion portion, the improvement comprising stiff longitudinal retaining portions affixed to the opposite ends of said upholstery portion, said upholstery portion being of such a length that said cushion portion will be at least partially compressed when said opposite ends are in overlying relationship with each other, said cushion portion being recessed in the vicinity of said opposite ends, and a generally tubular member being located in said recess, said tubular member having an outwardly facing longitudinal slot, said overlying opposite ends and said retaining portions being positioned within said tubular member so that an edge of each of said retaining portions is in contact with the inner wall of said tubular member at a location closely adjacent to said longitudinal slot, said retaining portions preventing the removal of said opposite ends from said longituudinal slot.

2. The seat member of claim 1 wherein said retaining portions are sewn to said opposite ends of said upholstery portions.

3. The seat member of claim 2 wherein said retaining portions are sewn to said opposite ends of said upholstery portions along a line parallel to an edge of the inner wall of said tubular member.

4. The seat member of claim 1 wherein said retaining portions comprise generally flat strips of plastic.

5. The seat member of claim 1 wherein said retaining portions comprise generally flat strips of fiberboard.

6. The seat member of claim 1 wherein said retaining portions comprise generally flat strips and said longitudinal slot has a width which is less than the combined thickness of a pair of retaining portions and a pair of upholstery portions while being at least as great as the thickness of a single retaining portion and a pair of upholstery portions.

7. The seat member of claim 1 wherein said retaining portions comprise an inner portion of a member which also includes an outer portion which covers the edges of said longitudinal slot.

8. The seat member of claim 7 wherein said member is formed of extruded plastic and said outer portion includes an angled lip portion which covers the edge formed by the intersection of said longitudinal slot with the outer surface of said generally tubular member.

* * * * *